United States Patent
Chaiken et al.

(10) Patent No.: US 11,526,411 B2
(45) Date of Patent: Dec. 13, 2022

(54) SYSTEM AND METHOD FOR IMPROVING DETECTION AND CAPTURE OF A HOST SYSTEM CATASTROPHIC FAILURE

(71) Applicant: DELL PRODUCTS, LP, Round Rock, TX (US)

(72) Inventors: Craig L. Chaiken, Pflugerville, TX (US); Siva Subramaniam Rajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 423 days.

(21) Appl. No.: 16/790,021

(22) Filed: Feb. 13, 2020

(65) Prior Publication Data
US 2021/0255939 A1 Aug. 19, 2021

(51) Int. Cl.
*G06F 11/14* (2006.01)
*G06F 13/42* (2006.01)

(52) U.S. Cl.
CPC ...... *G06F 11/1474* (2013.01); *G06F 13/4282* (2013.01); *G06F 2201/82* (2013.01); *G06F 2213/0026* (2013.01)

(58) Field of Classification Search
CPC ............. G06F 11/1474; G06F 13/4282; G06F 2201/82; G06F 2213/0026; G06F 11/0757; G06F 11/0772; G06F 11/1417; G06F 11/1441

USPC .......................................................... 714/19
See application file for complete search history.

(56) References Cited

U.S. PATENT DOCUMENTS

| | | | |
|---|---|---|---|
| 7,272,731 B2 | 9/2007 | Chaiken | |
| 2006/0080561 A1 | 4/2006 | Chaiken | |
| 2006/0156291 A1 | 7/2006 | Mahmoud et al. | |
| 2010/0242050 A1* | 9/2010 | Chan | G06F 9/524 710/200 |
| 2016/0378587 A1* | 12/2016 | Zhang | G06F 11/0772 714/55 |
| 2018/0293194 A1 | 10/2018 | Chaiken et al. | |
| 2019/0278651 A1 | 9/2019 | Thornley et al. | |
| 2021/0042228 A1* | 2/2021 | Herdrich | G06F 12/0895 |

* cited by examiner

*Primary Examiner* — Yair Leibovich
(74) *Attorney, Agent, or Firm* — Larson Newman, LLP

(57) ABSTRACT

An information handling system includes a non-volatile storage device communicatively coupled to a boot processor and an application processor. The boot processor, prior to the execution of a hang sensitive transaction, stores information associated with the hang sensitive transaction at a memory device. The application processor is configured to detect a catastrophic failure of the hang sensitive transaction. In response to the detection of the catastrophic failure, the application processor retrieves the information stored at the memory device and store the information at the non-volatile storage device.

19 Claims, 10 Drawing Sheets

SYSTEM AND METHOD FOR IMPROVING DETECTION AND CAPTURE OF A HOST SYSTEM CATASTROPHIC FAILURE

FIELD OF THE DISCLOSURE

The present disclosure generally relates to information handling systems, and more particularly relates to improving detection and capture of a host system catastrophic failure.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a non-volatile storage device communicatively coupled to a boot processor and an application processor. The boot processor, prior to the execution of a hang sensitive transaction, stores information associated with the hang sensitive transaction at a memory device. The application processor is configured to detect a catastrophic failure of the hang sensitive transaction. In response to the detection of the catastrophic failure, the application processor retrieves the information stored at the memory device and store the information at the non-volatile storage device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
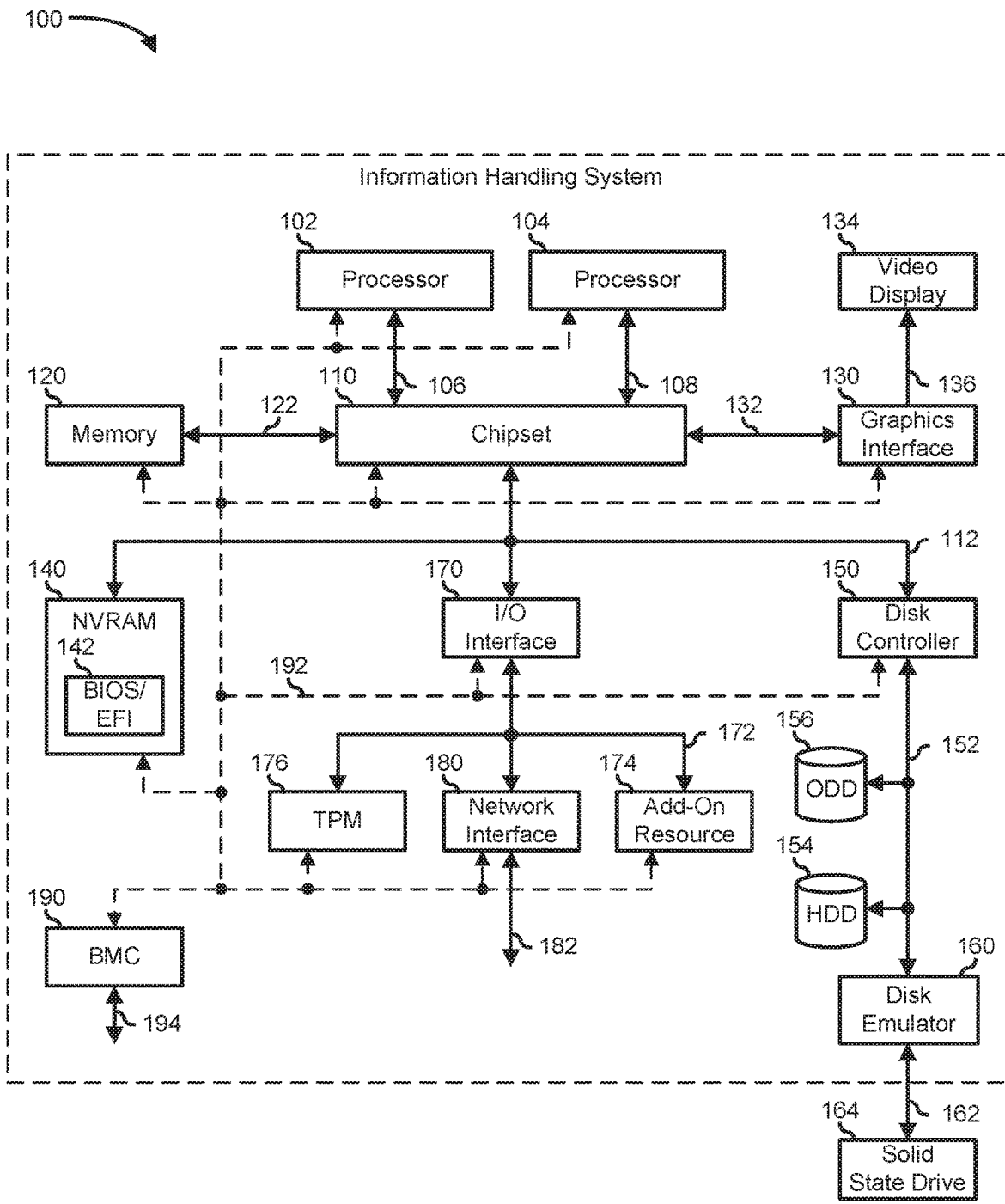
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a Serial Peripheral Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed of within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular-based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular-based interface, or a combination thereof. Network channel 182 can be connected to an external network resource (not illustrated). The network resource can include another information handling system, a data storage system, another network, a grid management system, another suitable resource, or a combination thereof BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and ECs included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, which is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus, BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Typically, when an error occurs, the information handling system manages data or information associated with the error. For example, an operating system may display information associated with the error to a user or log the information. This information, also referred to as forensic data, is important to identify the root cause of the error. One difficulty with reporting the forensic data is if the error occurs before the operating system is operational. For example, if the error occurs before initialization of the operating system, then only limited BIOS functionality is typically available to log or to present the information associated with the error to the user and/or otherwise to handle the error.

Another difficulty with reporting the forensic data is if the error or failure occurred catastrophically which happens to approximately 75% of BIOS failures. This is challenging because a large portion of the BIOS failures occur when a boot processor hangs while performing an input/output (I/O) access, a memory mapped I/O (MMIO) access, a PCIe access, or a CPU model-specific register (MSR) access which makes it difficult to log the forensic data. Another example of catastrophic failures typically occur when the information handling system hang when trying to resume from standby. In yet another difficulty is when the operating system boot drive goes offline due to a PCIe failure, a SATA failure, or an HDD firmware failure. When this occurs, no operating system memory dump file can be written so the forensic data is lost.

The current disclosure includes systems and methods that may be implemented to detect the catastrophic failure and capture forensic data associated with the catastrophic failure. The forensic data may be used for further analysis such as for debugging and/or for isolating issues associated with the catastrophic failure reducing debugging costs and to facilitate debugging of otherwise failures with no debug information. In one embodiment, the current systems and methods may initialize a watchdog task and/or an SMI on an application processor before issuing a hang sensitive transaction at a bootstrap processor, wherein the watchdog task and/or the SMI may be configured to monitor and/or detect when the catastrophic failure occurs. Also, the SMI may be configured to store the forensic data associated with catastrophic failure in a non-volatile storage device. The hang sensitive transaction may include an input/output (I/O) access, an MMIO access, a PCIe access, or a CPU MSR access, a UEFI callback routine, a power management event, etc.

Figure 2:
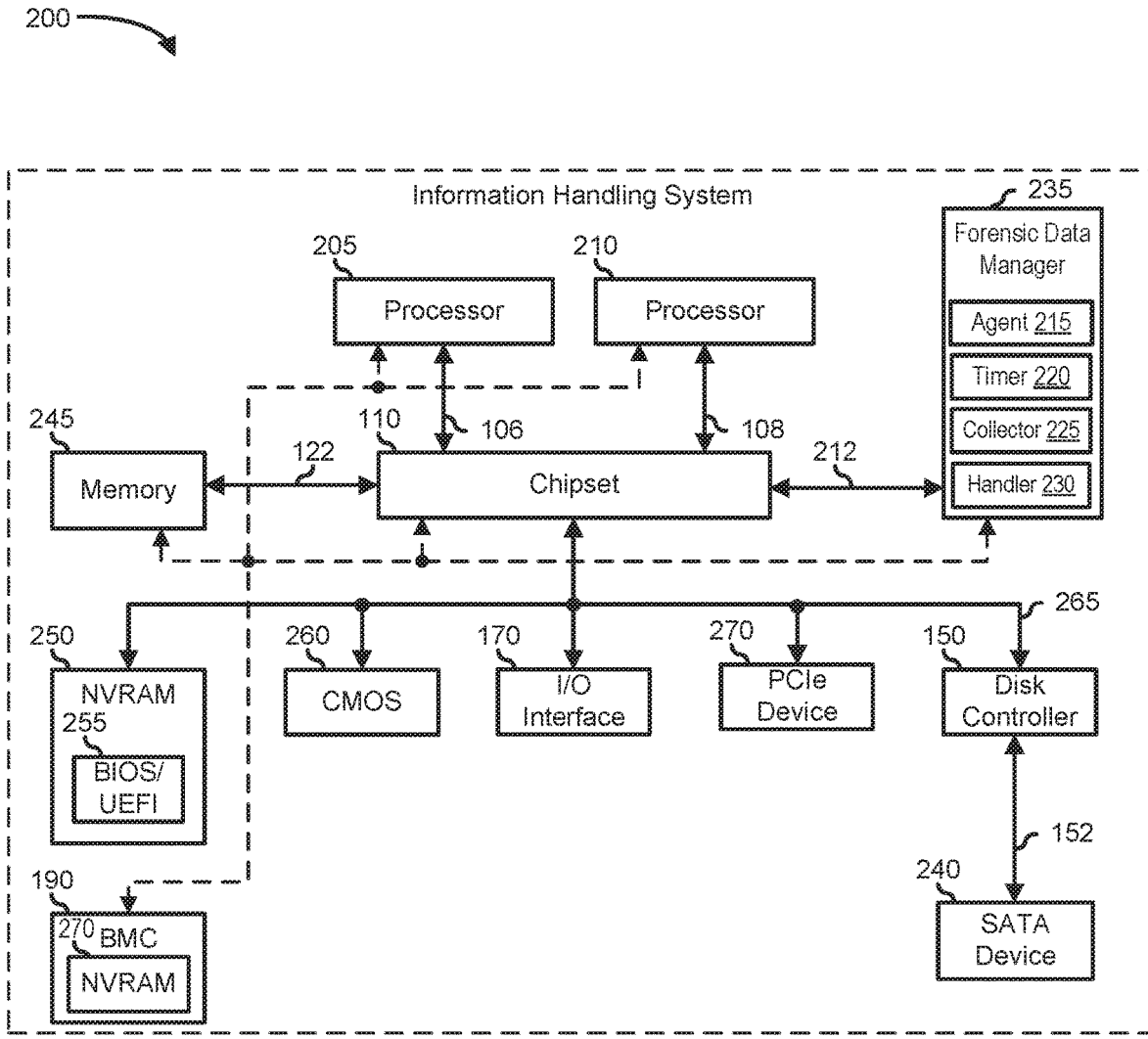
FIG. 2 is a block diagram illustrating an information handling system for improving detection and capture of a host system catastrophic failure, according to an embodiment of the present disclosure.

FIG. 2 illustrates an information handling system 200 for improving detection and capture of a host system catastrophic failure. Information handling system 200 is similar to information handling system 100. Information handling system 200 includes a processor 205, a processor 210, a forensic data manager 235, a SATA device 240, and a memory 245, an NV-RAM 250 that includes a BIOS/UEFI 255, a communication channel 265, a complementary metal-oxide-semiconductor (CMOS) 260, and a PCIe device 270.

Processor 205 and processor 210 are similar to processor 102 and processor 104 and generally represent any type or form of processing unit capable of processing data or interpreting and executing instructions. In certain embodiments, processor 205 and processor 210 may receive instructions from a software application or module. These instructions may cause processor 205 and/or processor 210 to perform the functions of one or more of the embodiments described and/or illustrated herein. For example, processor 205 and/or processor 210 may also perform and/or be a means for performing all or some of the operations described herein. Processor 205 and processor 210 may also perform and/or be a means for performing any other operations, methods, or processes described and/or illustrated herein.

A set of processors in a multiprocessor information handling system typically includes one processor that is identified as a boot processor or the bootstrap processor. As used herein, the bootstrap processor executes the boot code of the information handling system, including the power-on-self-test (POST) code. The other processors of the information handling system are referred to herein as application processors. In the current disclosure, one of processor 205 and processor 210 may be used as the bootstrap processor and the remaining processor may be referred to herein as an application processor. The bootstrap processor may be communicatively coupled to the application processor via a chipset or a bus.

Information handling system 200 is depicted to include two processors. However, an information handling system can have more than two processors. If there are more than two processors, then the remaining processors may also be referred to as application processors. For the sake of this disclosure, it will be assumed that processor 205 is the bootstrap processor and processor 210 is the application processor. Each of the application processors and the bootstrap processor may be communicatively coupled to a common or shared memory like memory 245 such that any one of the application processors and the bootstrap processor may have access the shared memory. Also, the application processor may have access to a non-volatile storage device such as CMOS 245, NV-RAM 250 and/or NV-RAM 270. NV-RAM 250 is a BIOS or system NV-RAM while NV-RAM 270 is an EC NV-RAM.

Because system pathways may be blocked and/or error registers may be inaccessible, the application processor may be used herein as a means for reliable access to catastrophic failure data. For example, if an I/O card hang is responsible for the catastrophic failure, the error detection logic on the I/O card itself is also affected and may not log any event. A system reset can resolve the error, but the reset may destroy the system state that causes the failure and thus hamper fault diagnosis. Also, data associated with the I/O card hang may be lost.

Forensic data manager 235 which may be configured to identify, retrieve, parse, format and/or generate forensic data. Forensic data manager 235 is shown to be communicatively coupled to processor 205 and processor 210 via chipset 110 through an interface 212. In another embodiment, forensic data manager 235 may be included in application processor 210, memory 245 and/or NV-RAM 250. As shown, forensic data manager 235 includes an agent 215, a watchdog timer 220, a data collector 225, and an interrupt handler 230. Agent 215 may be configured to detect that a hang sensitive transaction or event like the I/O access, the MMIO access, the PCIe access, or the UEFI callback is about to be performed by one or more processors of information handling system, such as by the bootstrap processor. In another embodiment, the bootstrap processor and/or BIOS/UEFI 255 which is similar to BIOS/EFI 142 may trigger or alert agent 215 that a hang sensitive transaction or event is about to be performed. Agent 215 may be initiated by one or more components of forensic data manager 235 such as agent 215, the application processor and/or the bootstrap processor.

Watchdog timer 220 may be a hardware or software component that can be initiated before the hang sensitive transaction or event is to be performed. Watchdog timer 220 may be set to a maximum value to execute the hang sensitive transaction or event. In one embodiment, watchdog timer 220 may be configured to trigger an SMI when a timeout occurs. The SMI interrupts program execution by placing information handling system 200 in system management mode (SMM) which is a central processing operating mode that is independent of the operating system and application programs. Similar to agent 215, watchdog timer 220 may be initiated by one or more components of forensic data manager 235 such as agent 215, the application processor and/or the bootstrap processor. In one embodiment, the component that triggered agent 215 may be different from the component that triggered watchdog timer 220. In another embodiment, watchdog timer 220 may be initiated by the same component that triggered agent 215.

Data collector 225 may collect forensic data from one or more components of information handling system 200 such as PCIe bridges, PCIe devices, MMIOs, the BIOS such as BIOS/UEFI 255, SATA interfaces such as disk interface 152, SATA devices such as SATA device 240, etc. SATA device 240 includes hard disk drives, optical drives, and solid-state drives. Data collector 225 may be configured to identify, to retrieve, parse, and/or to generate PCI data associated with one or more devices coupled to information handling system 200 via a conventional PCI or a PCIe bus such as a local computer bus, a serial computer expansion bus, and the like. Data collector 225 may also be configured to identify, retrieve, parse, format, and/or generate MMIO data transmitted between peripheral devices and processor 205 and/or processor 210. The MMIO data includes data for storage controllers and USB devices to determine whether the storage controllers and/or the USB devices have gone offline or into error states. Examples of the peripheral devices include input devices, output devices, and input/output (I/O) devices such as a universal serial bus (USB) device, a memory card, and the like.

Data collector 225 may be configured to include BIOS log messages to provide history of platform failures, current temperature(s) of thermistors in information handling system 200. Data collector 225 may also be configured to identify, to generate, to retrieve and/or format BIOS data such as data associated with non-volatile firmware used to perform hardware initialization during the booting process and/or provide runtime services for the operating system and other programs. Further, data collector 225 may be configured to store the collected forensic data as raw data in a non-volatile storage device such as a CMOS, a non-volatile memory or storage device such as NV-RAM 250, NV-RAM 270, SATA device 240 or the like. In another embodiment, data collector 225 may be also configured to format collected forensic data, such as in a table format, before its storage. In yet another embodiment, a component of forensic data manager 235 aside from data collector 225 may be configured to format and/or store the forensic data.

In yet another embodiment, data collector 225 may also be configured to parse the forensic data before storing it in non-volatile memory storage or similar. Parsing may include determining whether a machine check is active, whether a boot device went offline, whether a PCIe bridge has an error or has gone offline, whether a storage controller is in an errant state, and/or whether a thermal sensor is at or within a threshold of a critical level. In certain embodiments, based on the parsing the method involves generating additional information such as a globally unique identifier for a batch of forensic data and/or timestamp.

Interrupt handler 230 such as an SMI handler may be configured to handle interrupts received during a catastrophic failure. Interrupt handler 230 may also be configured to maintain a queue of interrupt requests to be processed. Although shown as part of forensic data manager 235, interrupt handler 230 may be embodied in a memory coupled to BIOS/UEFI 255 such as NV-RAM 250. BIOS/UEFI 255 may broadly refer to a system, device or apparatus configured to identify, test, and/or initialize information handling resources of information handling system 200, including without limitation a UEFI. In another embodiment interrupt handler may be distinct from forensic data manager 235 and/or coupled to BMC 190.

Memory 245 which is similar to memory 120 generally represents any type or form of volatile or non-volatile storage devices or mediums capable of storing data and/or other computer-readable instructions. Memory 245 may be a memory that is shareable between one or more components of information handling system such as the boot processor, the application processor, and/or forensic data manager 235. Examples include without limitation, random access memory (RAM), read-only memory (ROM), flash memory, or any other suitable memory device. Although not required, in certain embodiments, information handling system 200 may include both a volatile memory unit and a non-volatile storage device such as NV-RAM 250. In one example, program instructions implementing forensic data manager 235 may be loaded into memory 120 and/or NV-RAM 250.

Communication channel 265 may be similar to I/O channel 112 and generally represents any type or form of infrastructure capable of facilitating communication between one or more components of information handling system 200. Examples of communication channel 265 includes a communication bus such as an industry-standard architecture (ISA), peripheral component interconnect (PCI), PCIe, or similar and/or a network. In one embodiment, communication channel 265 data includes one or more PCIe registers for one or more PCIe bridges of information handling system 200 and indicates whether one or more PCI devices have gone offline and the MMIO data includes information associated with storage controllers and USB devices and indicates whether the storage controllers or the USB devices have gone offline or into an error state. In these situations, an operating system memory dump typically cannot be written or logged.

Another example of a situation when a memory dump typically cannot be written is when a BIOS failure occurs. A large portion of BIOS failures occurs due to the bootstrap processor catastrophically failing while accessing an I/O component, an MMIO, a PCIe component, or a CPU MSR. Because the bootstrap processor hangs catastrophically before any forensic data can be captured, such failures make it difficult to log forensic information in many cases. One example of a catastrophic failure is when the information handling system fails to resume from standby mode. Failing to resume from standby mode typically occurs when the bootstrap processor attempts to access the I/O, the MMIO, the PCIe, the CPU MSRs, power management transitions such as from standby to a wake mode. Yet another example of a situation when a memory dump typically cannot be written is when the operating system boot drive goes offline due to a PCIe failure, a SATA failure, or an HDD firmware failure. These examples are typically identified as hang sensitive transactions.

To be able to capture the memory dump or forensic data associated with the hang sensitive transactions, the current system and method may enable a watchdog SMI task that will write forensic data to non-volatile storage before issuing one of the hang sensitive transactions. In addition, the BIOS and/or the operating system may be configured to write forensic data to a shared memory region or memory buffer prior to performing the hang sensitive transaction, so that the forensic data can be written to a non-volatile storage device in case the hang sensitive transaction times out. The memory region used may be of type ACPI platform communication channel (PCC) because that is a BIOS accessible memory type that may be included in an operating system dump file. Finally, the current system and method may use the pre-existing periodic Intel® Dynamic Platform and Thermal Framework (DPTF) SMI handler, to reset a watchdog timeout SMI counter. The watchdog timeout SMI may be triggered if the operating system hangs so forensic data can be written to the non-volatile storage.

Figure 3:
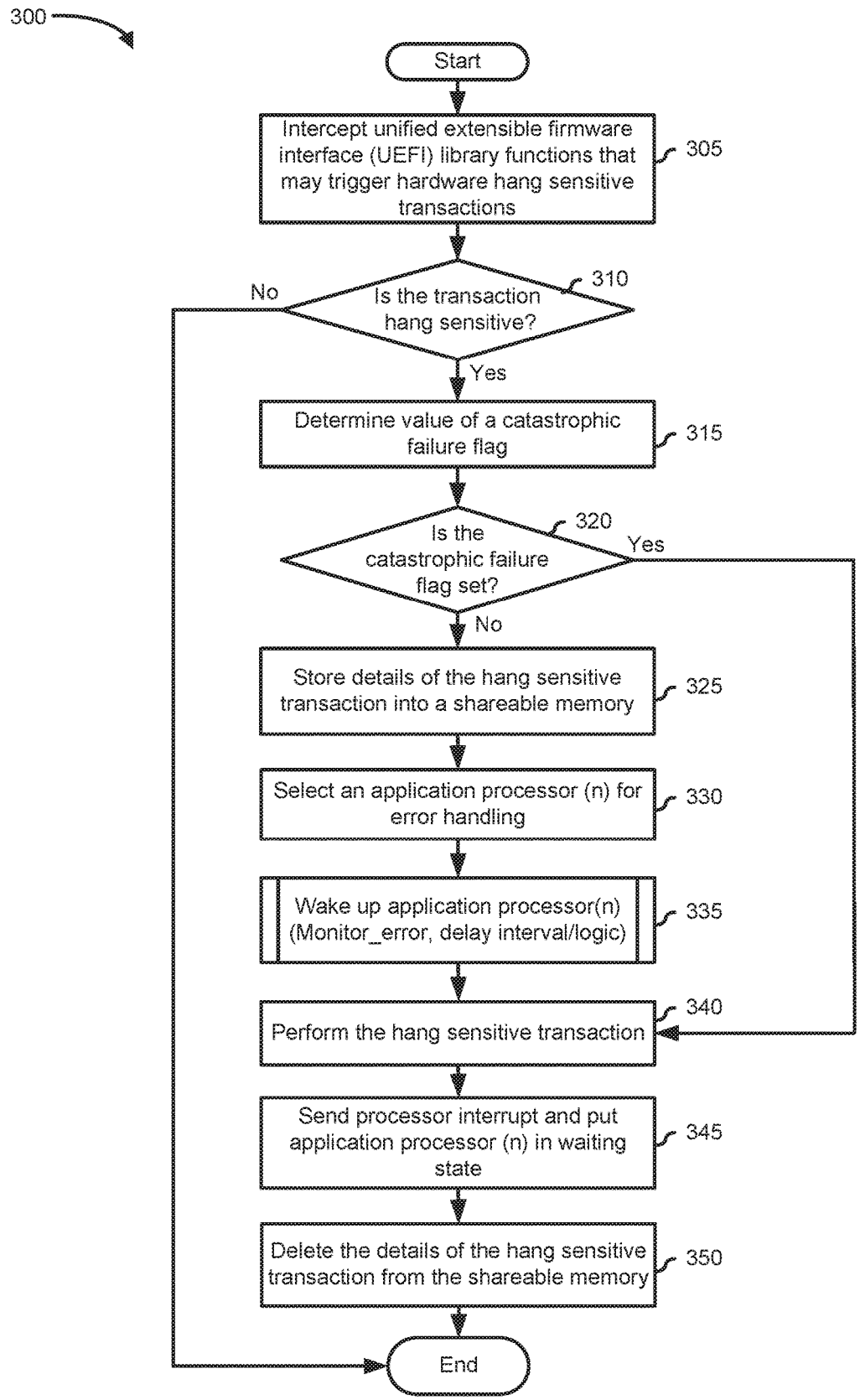
FIG. 3 is a flowchart illustrating an example of a method for improving detection and capture of the host system catastrophic failure, according to an embodiment of the present disclosure.

FIG. 3 illustrates a method 300 for improving detection and capture of a host system catastrophic failure. Method 300 includes saving forensic data after the catastrophic failure of a hardware access event. Method 300 may be performed by one or more components of FIG. 2 such as Forensic data manager 235, BIOS/UEFI 255, bootstrap processor, and/or the application processor. Method 300 typically starts at block 305 where the method intercepts a transaction that uses one of the UEFI libraries before the transaction is to be performed. The UEFI libraries may include functions known to trigger catastrophic failures such as software hangs or hardware hangs such as an MMIO access, a CPU MSR access, an I/O access, a PCIe access, etc. Block 305 may be performed by the application processor before the bootstrap processor executes the hardware access event such as a function from one of the UEFI libraries.

The method proceeds to decision block 310 where the method determines whether the intercepted transaction is a hang sensitive transaction. Hang sensitive transactions may be defined by an administrator or programmatically determined before execution of block 305. For example, the MMIO access, the CPU MSR access, the I/O access, the PCIe access may be identified as hang sensitive transactions. In another embodiment, the hang sensitive transactions may be statically identified during the software and/or firmware development and/or update. If the method determines that the transaction to be executed is a hang sensitive transaction, then the "YES" branch is taken, and the method proceeds to block 315. If the method determines that the transaction to be executed is not a hang sensitive transaction, then the "NO" branch is taken, and the method ends.

At block 315, the method determines or reads the value of a catastrophic failure flag that may be stored in an NV-RAM such as the BIOS NV-RAM, the EC NV-RAM. In another embodiment, the method may also read the value of the catastrophic failure flag stored in the CMOS, the cache buffer, etc. As used herein, catastrophic failures may cause an immediate and complete loss of the functionality of the information handling system. An example of the catastrophic failure is a memory DIMM that has received a static shock and immediately generates a "No POST/No Video" symptom with a beep code emitted for missing or nonfunctional memory. When the information handling system encounters a catastrophic failure, the catastrophic failure flag, such as an "NVRAM_CATERR" flag may be set, that is set to "true" or 1 from an initial value of "false" or 0 or something similar. Also, an error code along with other details associated with the catastrophic failure may be logged. Finally, the catastrophic failure flag may also indicate that an event log associated with the catastrophic failure still needs to be processed and/or uploaded, such as to the manufacturer of the information handling system. The event log may be stored in the information handling system's NV-RAM, an EC NV-RAM, or the CMOS. Typically, the event log associated with the catastrophic failure from any one or all of the aforementioned storage is uploaded to the manufacturer of the information handling system's website for analysis and debugging. The event log may also be accessed by a diagnostic test tool for repair and/or analysis. Typically, the catastrophic failure flag may be read automatically during POST by the diagnostic test tool. After the event log has been processed and/or uploaded the catastrophic failure flag may be reset to "false" or 0.

The method proceeds to decision block 320 where a decision is made on whether the catastrophic failure flag is set. If the method determines that the catastrophic flag is set, then the "YES" branch is taken, and the method proceeds to block 340. If the method determines that the catastrophic failure flag is not set, then the "NO" branch is taken, and the method proceeds to block 325. At block 325, the method saves the details of the hang sensitive transaction. In particular, the boot processor may read information from one or more registers and stores them into a RAM that is shared by the application processor with one or more components of the information handling system such as the bootstrap processor, the BIOS/UEFI, the forensic data manager, etc. The details may include a transaction identifier and an error code such as CATERR, P_CATERR-N, CATERR-N, NVRAM_CATERR, etc. In one embodiment, the method may determine which registers to read the details based on the hang sensitive transaction. For example, the method reads the details from the MMIO register, the CPU MSR, the I/O register, the PCIe register, the SATA register, etc. The information read by the method may include a status, a value, an operation, an address, etc. The registers from whom the information is read may be hardcoded, set by a user such as during manufacture, set by an administrator such as in the BIOS setup, dynamically determined during the operation of the method, etc. After storing the forensic data, the method proceeds to block 330.

At block 330, the method selects one of the processors to monitor the hang sensitive transaction. The method selects the processor that is other than the processor that will perform the hang sensitive transaction. The selected processor may be used for error handling. For example, if the bootstrap processor performs the hang sensitive transaction, then one of the application processors may be selected. After selecting the processor, the method proceeds to block 335 where the method activates or wakes up the selected processor application processor which may then perform method 400 of FIG. 4. At block 335, the method passes information to the application processor selected to be woken up. In particular, the method may pass a value of various parameters such as an error parameter, a delay counter parameter and/or a logic parameter. The error parameter may include an error name or identifier of an error parameter to be monitored. The delay interval or delay counter parameter may be in seconds or in fractions of a second. The value of the delay counter parameter is the approximate time to process the hang sensitive transaction. In particular, the delay counter parameter may be the maximum time duration to process the hang sensitive transaction which may also be referred to as predetermined threshold duration. The logic parameter may include a function call or logic to be performed by the selected processor. The method then proceeds to block 340.

At block 340, the method performs a hardware access such as a read or a write operation. The method then proceeds to block 345, where the method sends a processor interrupt and puts the selected application processor in a waiting state. The processor interrupt may be sent to the BIOS/UEFI and/or the forensic data manager allowing it to take appropriate action. At block 350, the method deletes the details of the hang sensitive transaction or its forensic data that was stored in the shared memory also referred to as shareable. Then the method ends.

Figure 4:
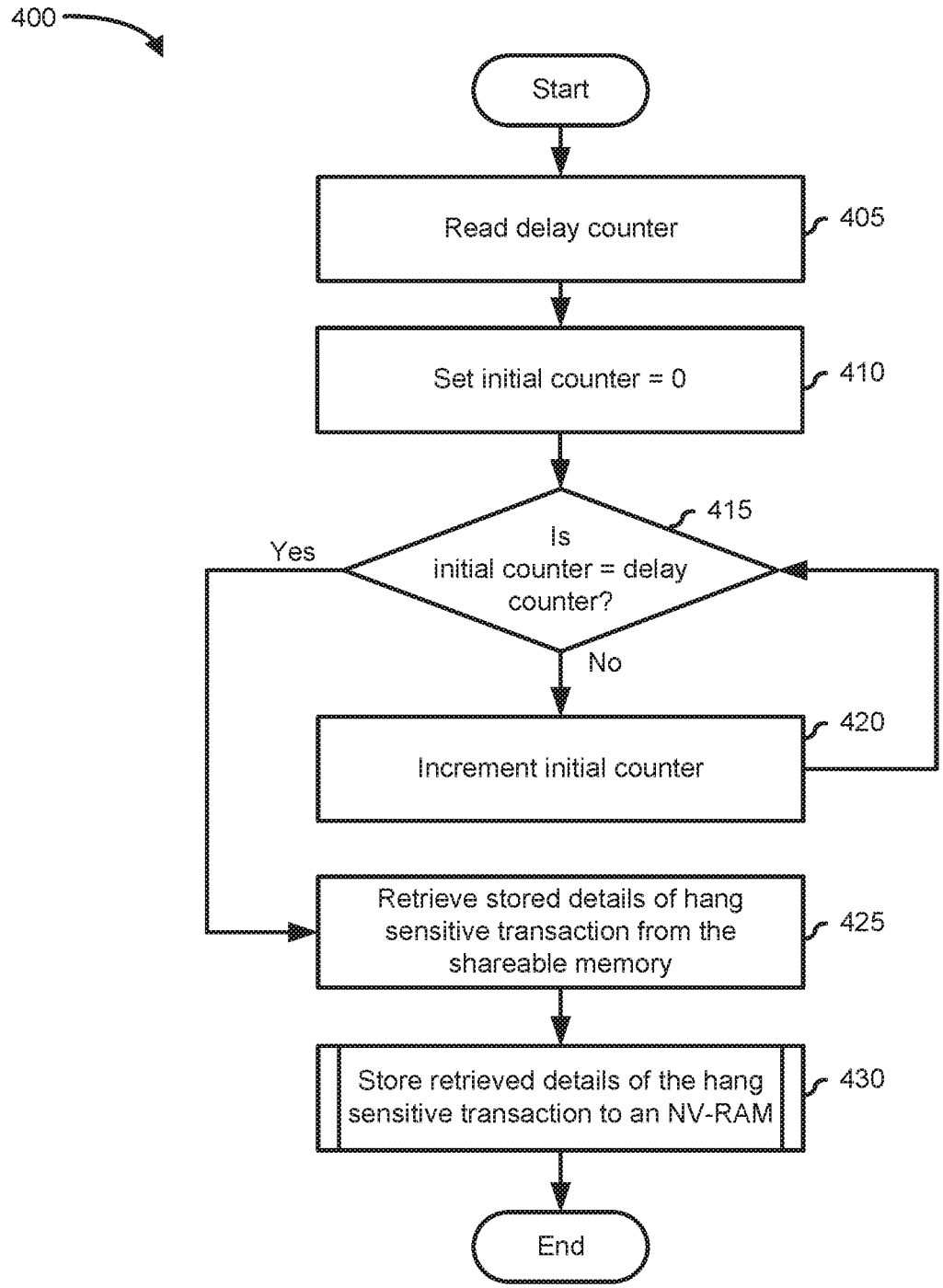
FIG. 4 is a flowchart illustrating an example of a method for monitoring the hardware access event, according to an embodiment of the present disclosure.

FIG. 4 illustrates a method 400, which is a detailed illustration of block 340 in FIG. 3, for monitoring the hang sensitive transaction. In particular, method 400 may monitor the hang sensitive transaction to determine whether a catastrophic failure has occurred based on whether the hang sensitive transaction timed out. As used herein, the application processor acts as a watchdog timer. Under normal a circumstance, that is the hang sensitive transaction succeeds, the application processor may be put back to sleep before the timeout counter reaches zero or an identified threshold. For example, because block 340 may be performed in parallel with method 400, the application processor may be put to sleep or waiting state before the timeout occurs such as when method 300 proceeds to block 345 upon successful execution of the hang sensitive transaction. Further, method 400 may be running in the application processor and will be killed when the bootstrap processor issues an inter-processor interrupt and puts the thread in a waiting state. Similar to method 300, method 400 is may be performed by one or more components of FIG. 2.

Method 400 typically starts at block 405 where the method reads the values of the parameters passed to it. In particular, the method may read the value of the delay counter parameter. The method proceeds to block 410 where the value of an initial counter is set to zero. The initial counter may also be referred to as a watchdog timer or a timeout counter in a RAM address that is shared by the processors such as the bootstrap processor and the application processor. The watchdog timer may be configured to provide a timer event occurrence such as when it determines that a timeout has occurred based on the delay counter when processing the hang sensitive transaction. The timeout is an unrecoverable error condition that may cause system pathways to be blocked. As a result, the error registers may either be inaccessible, or the system may not guarantee reliable access to the error log registers.

The method proceeds to decision block 415 where the method determines whether a timeout has occurred. In particular, the method determines whether the current value of the initial counter is equal to the value of the delay counter which is the maximum time duration the hang sensitive transaction takes to complete. In other words, the method determines if the transaction has timed out. If the current value of the initial counter is equal to the value of the delay counter, then the "YES" branch is taken, and the method proceeds to block 425. If the current value of the initial counter is not equal to the value of the delay counter, then the "NO" branch is taken, and the method proceeds to block 420 where the method increments the current value of the initial counter. The default value of the increment may be set a second, a fraction of a second, a millisecond, a microsecond, etc. The value of the increment may be based on the value of the delay counter. For example, if the value of the delay counter is one second, then the value of the increment may be a fraction of a second. In another example, if the value of the delay counter is 30 seconds, then the value of the increment may be one second. In another embodiment, the value of the initial counter may be set to be equal to the value of the delay counter and instead of incrementing the initial counter, the value initial counter may be decremented until it reaches zero, wherein the timeout occurs.

The initial counter may be incremented while the hang sensitive transaction is being executed at another processor such as the bootstrap processor. The application processor may receive an indication and/or detect that the hang sensitive transaction finished execution. In response to receiving the indication and/or detecting that the hang sensitive transaction has finished execution, the method may stop incrementing the initial counter. In another embodiment, the processor executing the hang sensitive transaction may have finished executing the transaction and delete the details of the hang sensitive transaction from the shareable memory at block 350 of FIG. 3 before the application processor can retrieve the details at block 425.

At block 425, the method may get or retrieve the details or a portion thereof that is stored in the shared memory at block 325 of FIG. 3. For example, the method may read the information from the MMIO register, the MSR register, the I/O register, the PCIe register, etc. that were stored in the shared memory. The method may determine whether the information is stored in a CMOS first prior to determining whether the information is stored in a BIOS NV-RAM, and/or an EC NV-RAM.

After retrieving the details stored in the shared memory, the method proceeds to block 430 where the information, such as driver information that was read in block 425 is passed as parameter values which may be then stored in the EC NV-RAM, the CMOS, or the system or BIOS NV-RAM. These storage devices are non-volatile and can be accessed during a forensic data dump. The method may also set the catastrophic failure flag such as to true or 1 from an initial value of false or 0. This indicates that a catastrophic failure has occurred and that there is a catastrophic failure event log for upload to the service website or manufacturer. The catastrophic event log may be used for analysis or debugging by a customer service representative or a repair technician for example. In a particular example, the method may invoke the command "STORE DATA IN NVRAM" with the NVRAM_CATERR flag and driver information such as the data from the MMIO register, the CPU MSR register, the I/O register, the PCIe register, etc.

Figure 5:
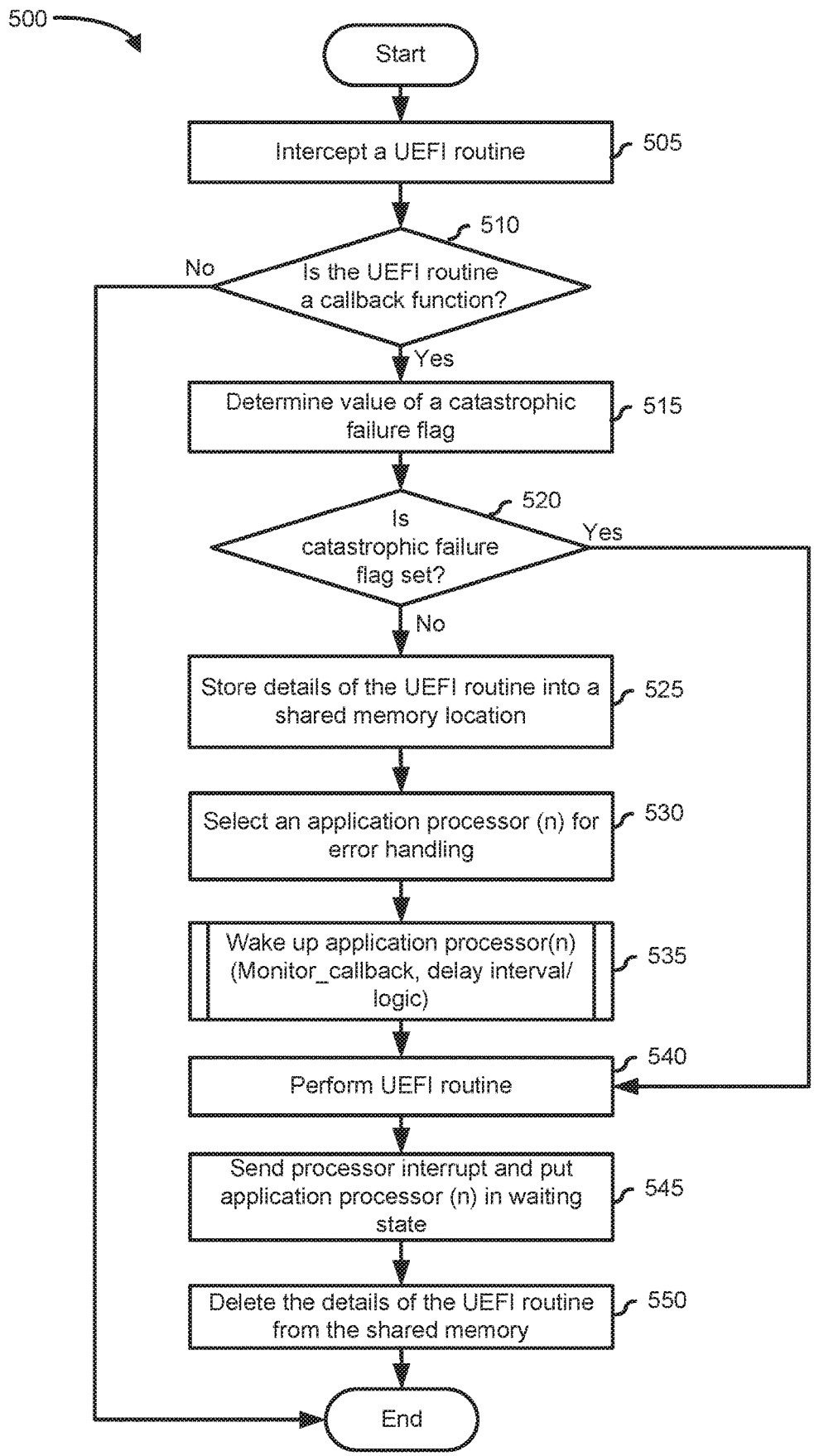
FIG. 5 is a flowchart illustrating an example of a method for saving forensic data after a catastrophic failure of a unified extensible firmware interface (UEFI) routine, according to an embodiment of the present disclosure.

FIG. 5 illustrates a method 500 for saving forensic data after a catastrophic failure of a UEFI routine callback function. Method 500 may be performed by one or more components of FIG. 2 such as forensic data manager 235, BIOS/UEFI 255, the bootstrap processor, and/or the application processor. Method 500 typically starts at block 505 where the method intercepts a UEFI routine before the routine is to be performed. For example, the method may intercept the UEFI routine that is known to trigger catastrophic failures such as a callback function. Block 505 may be performed by the application processor before the bootstrap processor executes the UEFI routine callback function.

The method proceeds to decision block 510 where the method determines whether the intercepted UEFI routine is a callback function. Callback functions are functions passed into another function as an argument, which is then invoked inside the outer function to complete some kind of routine or action. For example, a callback function is a routine whose execution is triggered by the reception of an interrupt. A callback function may be identified using the properties of the UEFI routine. If the method determines that the UEFI routine to be executed is a callback function, then the "YES" branch is taken, and the method proceeds to block 515. If the method determines that the UEFI routine to be executed is not a callback function, then the "NO" branch is taken, and the method ends.

At block 515, the method determines or reads the value of a catastrophic failure flag that may be stored in an NV-RAM similar to block 315 of FIG. 3. For example, the method may read NVRAM_CATERR flag from the BIOS NV-RAM, the CMOS, the EC NV-RAM, the cache buffer, etc. The method proceeds to decision block 520 where a decision is made on whether the catastrophic failure flag such as NVRAM_CATERR is set. If the method determines that the catastrophic flag is set, then the "YES" branch is taken, and the method proceeds to block 540. If the method determines that the catastrophic failure flag is not set, then the "NO" branch is taken, and the method proceeds to block 525 where the method saves the details of the UEFI routine such as callback driver name and callback signature similar to block 330. In particular, the method may read information from one or more registers and stores them into a RAM that is shared by the application processor with one or more components of the information handling system. In one embodiment, the method may determine which registers to read the information from based on the UEFI routine. The method proceeds to block 530.

At block 530, the method selects one of the processors to monitor the UEFI routine similar to block 330 of FIG. 3. After selecting the application processor, the method proceeds to block 535 where the method activates or wakes up and passes the information to the application processor which may then perform method 600 of FIG. 6. In particular, the method may pass a value of one or more parameters such as an error parameter, a delay counter parameter, and/or a delay logic parameter. The value of the delay counter parameter is the approximate time to process the UEFI routine. In particular, the delay counter parameter may be the maximum time to process the UEFI routine. The method then proceeds to block 540.

At block 540, method performs the UEFI routine. After performing the routine, the method proceeds to block 545, where the method sends a processor interrupt and puts the selected application processor in a waiting state. The processor interrupt may be sent to the BIOS/UEFI and/or the forensic data manager allowing it to take appropriate action. At block 550, the method deletes the details of the UEFI routine or its forensic data that was stored in the shared memory. Then the method ends.

Figure 6:
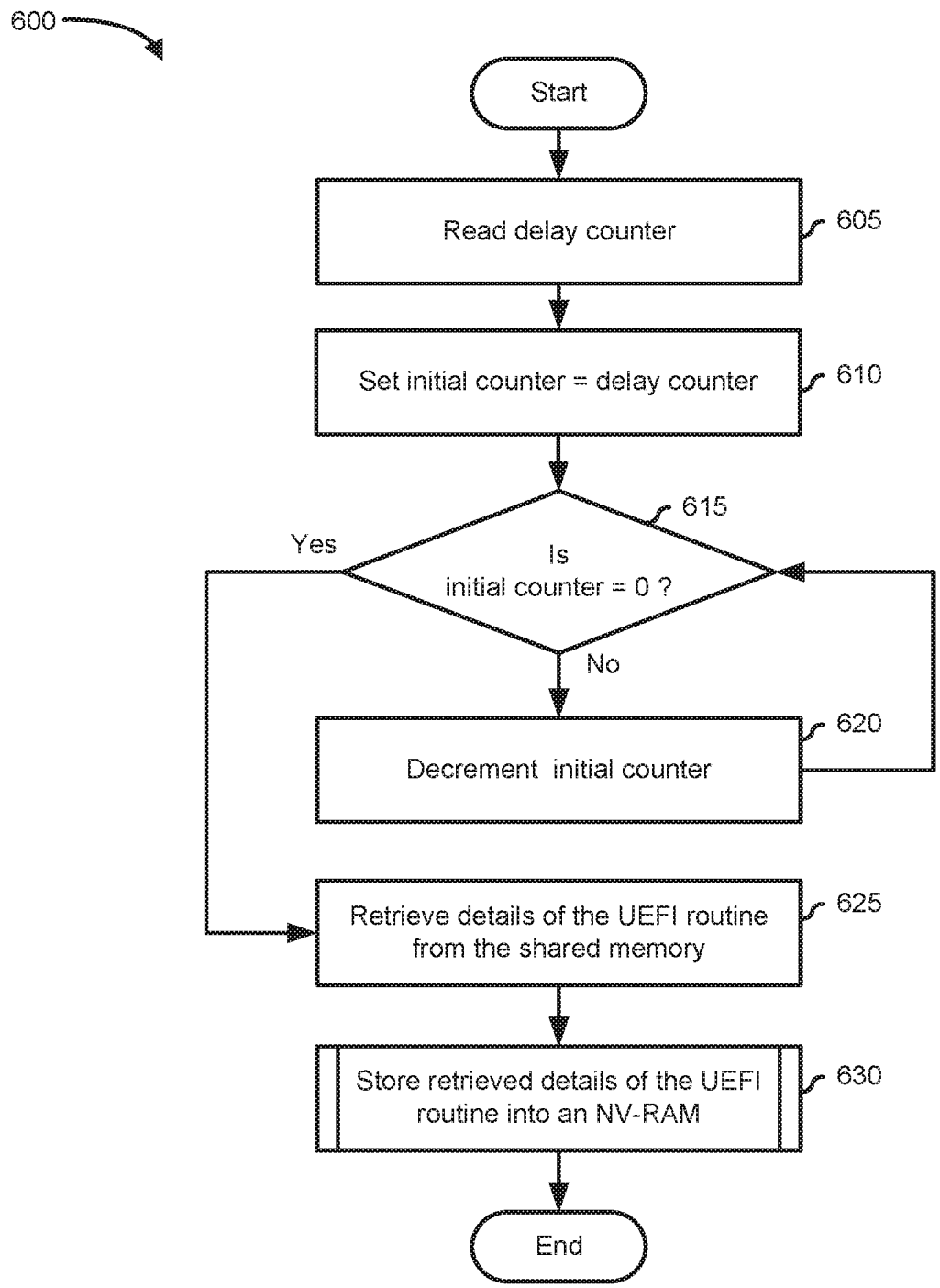
FIG. 6 is a flowchart illustrating an example of a method for monitoring the UEFI routine, according to an embodiment of the present disclosure.

FIG. 6 illustrates a method 600 for monitoring the UEFI routine, which is a detailed illustration of block 535 of FIG. 5. In particular, method 600 may monitor the UEFI routine to determine whether a catastrophic failure has occurred. Further, method 600 may be running in the application processor and this code will be killed when the bootstrap processor issues an inter processor interrupt and puts the thread in waiting state. Similar to method 500, method 600 may be performed by one or more components of FIG. 2.

Method 600 typically starts at block 605 where the method reads the values of the parameters passed to it. In particular, the method may read the value of the delay counter parameter. The method proceeds to block 610 where the value of an initial counter is set to zero. The initial counter may also be referred to as a watchdog timer in a RAM address that is shared by the processors, such as the bootstrap processor and the application processor. The watchdog timer may be configured to determine whether a timeout has occurred based on the delay counter which is the allowable time of execution of the UEFI routine.

The method proceeds to decision block 615 where the method determines whether the UEFI routine timed out, similar to decision block 415 of FIG. 4. In one embodiment, the method determines whether the current value of the initial counter is equal to zero. In other words, the method determines if the UEFI routine has timed out. If the current value of the initial counter is equal to zero, then the "YES" branch is taken, and the method proceeds to block 625. If the current value of the initial counter is not equal to zero, then the "NO" branch is taken, and the method proceeds to block 620 where the method decrements the current value of the initial counter. The default value of the decrement may be set to a second, a fraction of a second, a millisecond, a microsecond, etc. The value of the decrement may be based on the value of the delay counter. For example, if the value of the delay counter is one second, then the value of the decrement may be a fraction of a second. In another example, if the value of the delay counter is 30 seconds, then the value of the decrement may be one second. In another embodiment, the value of the initial counter may be set to be equal to zero and instead of decrementing the initial counter, the value initial counter may be incremented until it equals to the delay counter, wherein the timeout occurs.

At block 625, the method may get or retrieve the details of the UEFI routine or forensic data or a portion thereof that is stored in the shared memory at block 525 of FIG. 5. For example, the method may read the information UEFI callback driver and UEFI callback entry point at the shared memory. After retrieving the details or forensic data stored in the shared memory similar to block 430, the method proceeds to block 630 where certain information, such as the callback data are passed as parameter values to method 700 of FIG. 7 where the information may be then stored in the EC NV-RAM, the CMOS, or the system NV-RAM. The method may also set the catastrophic failure flag such as to true or 1 from an initial value of false or 0. This indicates that a catastrophic failure has occurred and that there is a catastrophic failure event log for upload to the service website or manufacturer. In a particular example, the method may invoke the command "STORE DATA IN NVRAM" with the NVRAM_CATERR flag and driver/callback information.

Figure 7:
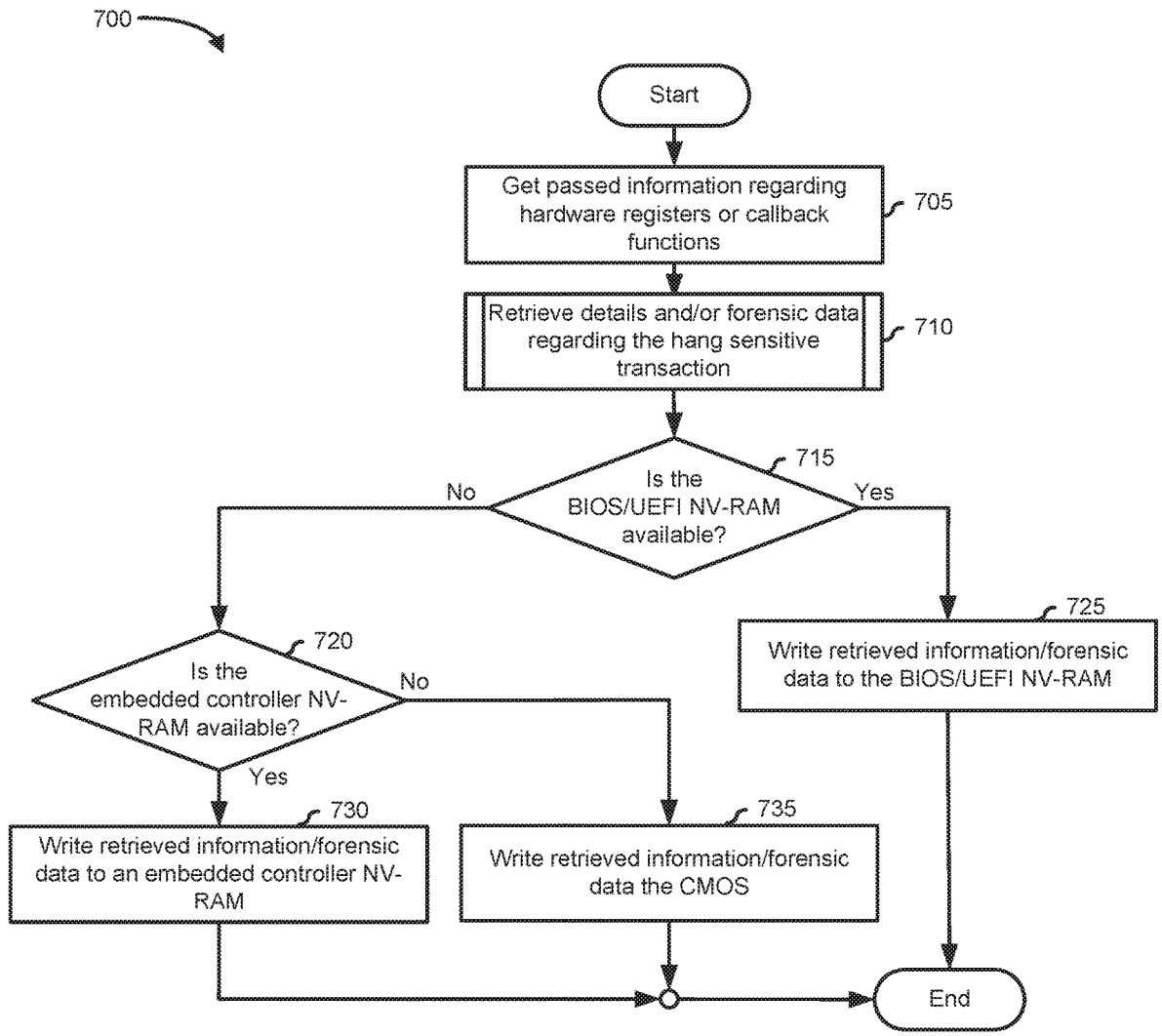
FIG. 7 is a flowchart illustrating an example of a method for storing the forensic data into a non-volatile memory, according to an embodiment of the present disclosure.

FIG. 7 illustrates a method 700, which is a detailed illustration of block 430 of FIG. 4 and block 630 of FIG. 6, for storing the catastrophic failure data into the non-volatile memory. Method 700 typically starts at block 705 where the method gets the passed information from block 430 of FIG. 4 or block 630 of FIG. 6. The passed information may include data of where to retrieve the forensic data and/or catastrophic event information or logs. For example, the passed information may include data retrieved from the hardware registers such as the MMIO register, the CPU MSR register, the I/O register, the PCIe register, etc. The passed information may also include information regarding the callback function such as its identifier and/or a timestamp.

The method proceeds to block 710 where the method gathers or retrieves forensic data regarding the transaction with the catastrophic event failure which may be based on the information that was passed at block 705. The method stores the gathered forensic data and/or the information passed into a RAM or a cache buffer. The method proceeds to decision block 715 where the method determines whether the system or BIOS NV-RAM is available. If the system or BIOS NV-RAM is available, then the "YES" branch of the decision block 715 is taken and the method proceeds to block 725 where the method writes the passed information and/or retrieved forensic data to the system or BIOS NV-RAM. After writing the passed information and/or retrieved forensic data to the system or BIOS NV-RAM, the method ends. If the system or BIOS NV-RAM is not available, then the "NO" branch of the decision block 715 is taken and the method proceeds to decision block 720.

At decision block 720, the method determines whether the EC NV-RAM is available. If the EC NV-RAM is available, then the "YES" branch of the decision block 720 is taken and the method proceeds to block 730 where the method writes the passed information and/or retrieved forensic data to the EC NV-RAM. If the EC NV-RAM is not available, then the "NO" branch of the decision block 720 is taken and the method proceeds to decision block 735 where the method writes the passed information and/or retrieved forensic data to the CMOS. After writing the passed information and/or retrieved forensic data, the method ends. In another embodiment, the method determines whether there is forensic data in the CMOS first followed by the EC NV-RAM with the BIOS or system NV-RAM last.

Figure 8:
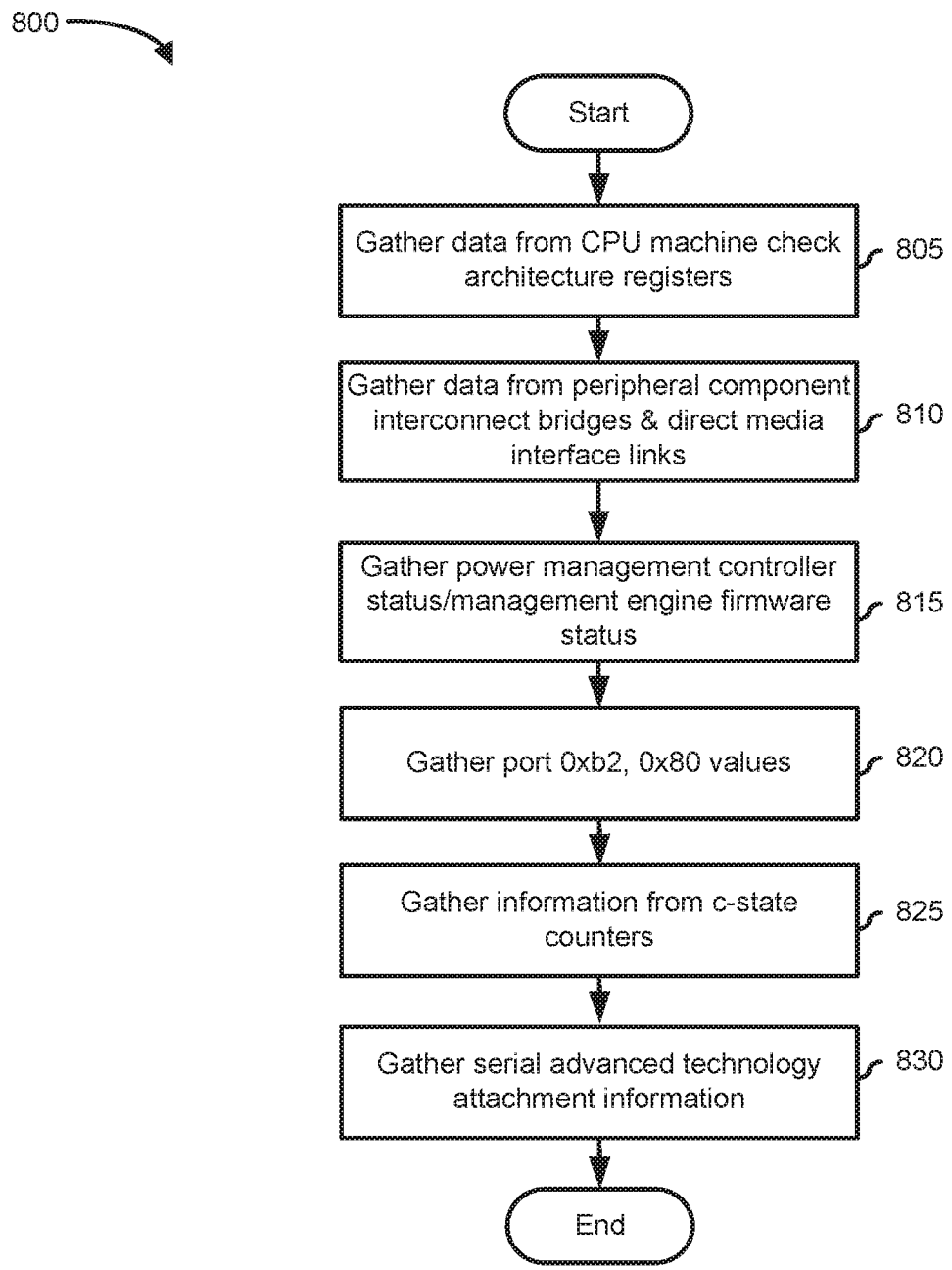
FIG. 8 is a flowchart illustrating an example of a method for retrieving the forensic data associated with a hang sensitive transaction that catastrophically failed, according to an embodiment of the present disclosure.

FIG. 8 illustrates a method 800, which is a detailed illustration of block 710 of FIG. 7, for retrieving information, details, or forensic data associated with the transaction or event that catastrophically failed. Method 800 may include more or fewer blocks based on the passed information from block 705 of FIG. 7. Method 800 typically starts at block 805 where the method gathers data from CPU machine check architecture (MCA) registers. The data may include information to determine whether there is an active machine check and/or to identify the component or the device that caused the machine check. When an error occurs during a boot-strap sequence before the initialization of a CPU employing MCA, the error may be logged in machine check banks. The machine check banks are a plurality of registers configured to store data upon occurrence of an error such as machine check errors. The machine check banks may detect, store, and report hardware errors to the BIOS and the BMC among others. The machine check banks may store an address of the hardware that produces the error, data describing the error, whether the error was recoverable, etc.

The method proceeds to block 810. At block 810, the method retrieves data regarding PCIe bridges and direct media interface (DMI) links. For example, the method retrieves data regarding a status, an error status, a slot presence, whether the error is correctable or uncorrectable, etc. of the PCIe bridges and/or DMI links. In some embodiments, the local computer bus data includes one or more PCIe registers of one or more PCIe bridges of the information handling system and indicates whether one or more PCIe devices associated with the information handling system are in error or gone offline. Because the DMI links the processor to the platform controller hub (PCH), confirming that the DMI is setup and communicating properly is important as a DMI link failure may result in a catastrophic failure or a system hang. For example, a platform environment control interface (PECI) over DMI interface error may indicate that PECI over DMI interface failure was detected and it is not functional anymore.

The method proceeds to block 815 where the method gathers data from the power management controller (PMC) and a manageability engine (ME) firmware. The PMC is responsible for platform-wide power management during active and idle times. The PMC performs the powering up and powering down of the power domains of the processor. It is the responsibility of the PMC to determine when the processor should exit dormant or shutdown mode. Data may be retrieved from the power management control and status register (PMCSR) which is a word register that may be used to determine and change the current power state and to control the power management interrupts. In some examples, the CPU may include registers that provide usage data for CPU, memory, and/or PCI subsystems that can be accessed from the ME firmware such as Intel management engine.

The method proceeds to block 820 where the method retrieves data from various ports such as ports 0xb2 and 0x80. During the POST the BIOS sends progress codes or POST codes to I/O port 0x80 or 80h. If the POST fails, the last POST code generated is left at port 80h. This POST code may be used to find out why the error occurred. On the other hand, a SMI may cause the system to enter SMM. The SMI can be caused by system software such as a driver execution environment (DXE) driver, for example, via an I/O access to a location considered special by the motherboard logic such as 0xb2. The method may also gather the software SMI value from the aforementioned port.

The method proceeds to block 825 where the method retrieves information from various c-state counters for determining the c-state based on the data stored in the counters. For example, the method may retrieve information from one or more package c-state residency MSRs such as a PKG_C3_RESIDENCY_COUNTER, a PKG_C6_RESIDENCY_COUNTER, a PKG_C6_RESIDENCY_COUNTER, a PKG_C7_RESIDENCY_COUNTER, a PKG_C8_RESIDENCY_COUNTER, a PKG_C9_RESIDENCY_COUNTER, and a PKG_C10_RESIDENCY COUNTER. Each of the package c-state residency MSR associated with a c-state counter provides useful debug information about the information handling system. The c-state counter values are processor-specific c-state code names.

The method proceeds to block 830 where the method gathers SATA information such as ports implemented and slot presence. An example of a SATA is a computer bus interface that connects host bus adapters to mass storage devices such as hard disk drives, optical drives, and solid-state drives. For example, the method may query a register such as the port implemented register that is a 32-bit value, wherein each bit represents a port. If the bit is set, the associated port is enabled and may have a device attached, otherwise, the port is free. In another example, the port signature register contains the device signature to determine which kind of device is attached at the port.

In addition to data gathered by the method as described above, other information such as metrics data may be gathered and used to get a more complete picture of the catastrophic failure. Such metrics data may include but are not limited to I/O usage and/or CPU and memory statistics that are obtained from the CPU, either through the ME or directly through the PECI bus. In another embodiment, an error hash of the catastrophic failure may be stored and may include information associated with and/or uniquely identifying the source of the system hang fault, such as the instruction module and offset, an identifier of one or more hardware component/s, etc.

Figure 9:
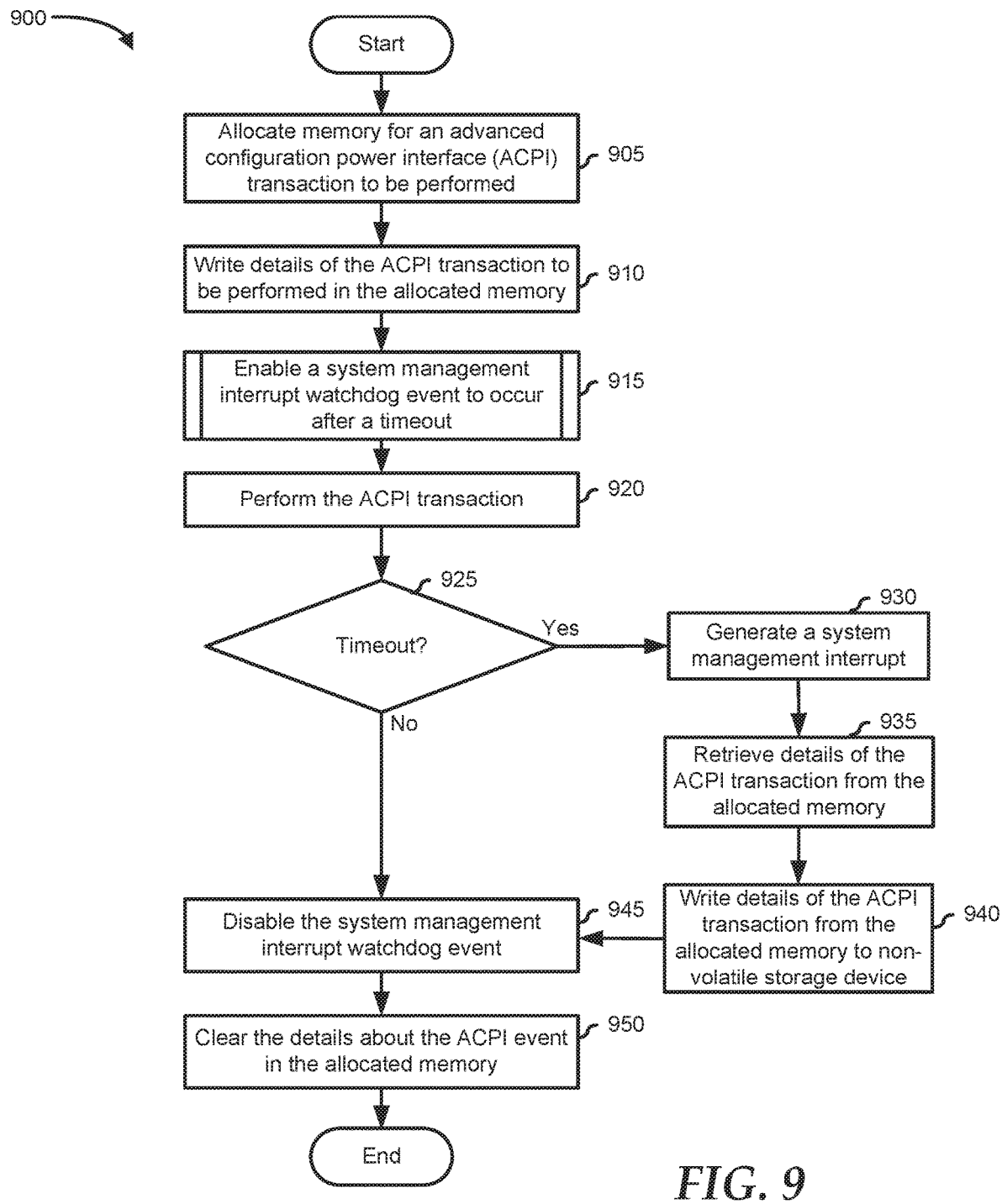
FIG. 9 is a flowchart illustrating an example of a method for saving forensic data after a catastrophic failure of an advanced configuration power interface (ACPI), according to an embodiment of the present disclosure.

FIG. 9 illustrates a method 900 for saving forensic data after a catastrophic failure of an ACPI event or transaction referred simply as ACPI transaction. Method 900 may be performed by one or more components of FIG. 2 such as forensic data manager 235, BIOS/UEFI 255, and/or the application processor. Method 900 typically starts at block 905 where the method may define an address space that may be implemented as one or more independent communications channels or subspaces such as a platform communications channel (PCC) for an ACPI transaction or event to be performed. In one or more embodiments, the address space may comply with the ACPI specification, revision 6.4; published January 2019 ("ACPI Specification") which provides a standard that enables intelligent power management and consumption. The PCC is an address space type that may be usable by platform entities such as a BMC and/or an interrupt handler such as an SMI handler to communicate with higher-level entities of the information handling system such as the operating system.

The method proceeds to block 910 where the method writes details of the ACPI transaction to an ACPI memory structure, such as the PCC, before executing the ACPI transaction. The details of the ACPI transaction may include a unique identifier of the ACPI transaction, the originator of the ACPI transaction, a checksum, a timestamp, etc. The ACPI transaction includes initiating a power management event or access to the I/O, the MMIO, or the PCIe, etc.

The method proceeds to block 915 where the method enables an SMI watchdog event to occur after a timeout. The method may set a watchdog timer to a maximum value to complete the ACPI transaction to be executed. In one embodiment, the application processor acts as the watchdog timer which is enabled before events capable of triggering a catastrophic failure is executed. The method proceeds to block 920 where the method performs the ACPI transaction. Block 920 and decision block 925 may be performed in parallel.

At decision block 925, where the method determines whether the watchdog timer, that is the ACPI transaction, has timed out. If the method determines that a timeout has occurred, then the "YES" branch of decision block 925 is taken and the method proceeds to block 930. If the method determines that the timeout has not occurred, then the "NO" branch of decision block 925 is taken and the method proceeds to block 940.

At block 930, the method generates an SMI which causes the information handling system to enter SMM. In this mode, a low-level handler routine is run to handle the SMI. In an embodiment, when the operating system triggers the SMI for instance, as a software interrupt via I/O port 0xB2, it passes arguments to an SMI handler via general-purpose registers. For example, the arguments may describe the I/O location of a particular port that prompted the SMI.

The method proceeds to block 935 where the method, the application processor in particular, retrieves the details of the ACPI transaction or at least a portion thereof from the allocated memory in block 910. The method proceeds to block 940 where the method writes the forensic data to a non-volatile storage device. In particular, the application processor saves the details of the ACPI transaction or at least a portion thereof by writing the aforementioned to the non-volatile storage device. The method may also write the details of the ACPI transaction from the PCC table and/or its current state to the non-volatile storage device. Details of the ACPI instruction that may be saved may include CPU MSRs such as cache errors, system bus errors, ECC errors, parity errors, etc. associated with the catastrophic failure, an identifier of one or more components of the information handling system that are associated with the catastrophic failure, etc. In another embodiment, the current context of the information handling system, such as copies of last CPU registers at the time of the catastrophic failure, may also be saved.

The method proceeds to block 945 where the method disables the SMI watchdog event and may be performed by the SMI handler. As shown, the method may disable the watchdog timeout SMI in response to the successful execution of the ACPI transaction, that is the ACPI transaction not timing out. In addition, the method may also disable the watchdog timeout SMI subsequent to writing the details of the ACPI transaction after the ACPI transaction timed out. The method proceeds to block 950 where the method may clear or delete the details associated with the ACPI transaction that was written in the allocated memory. Afterwards, the method ends.

Figure 10:
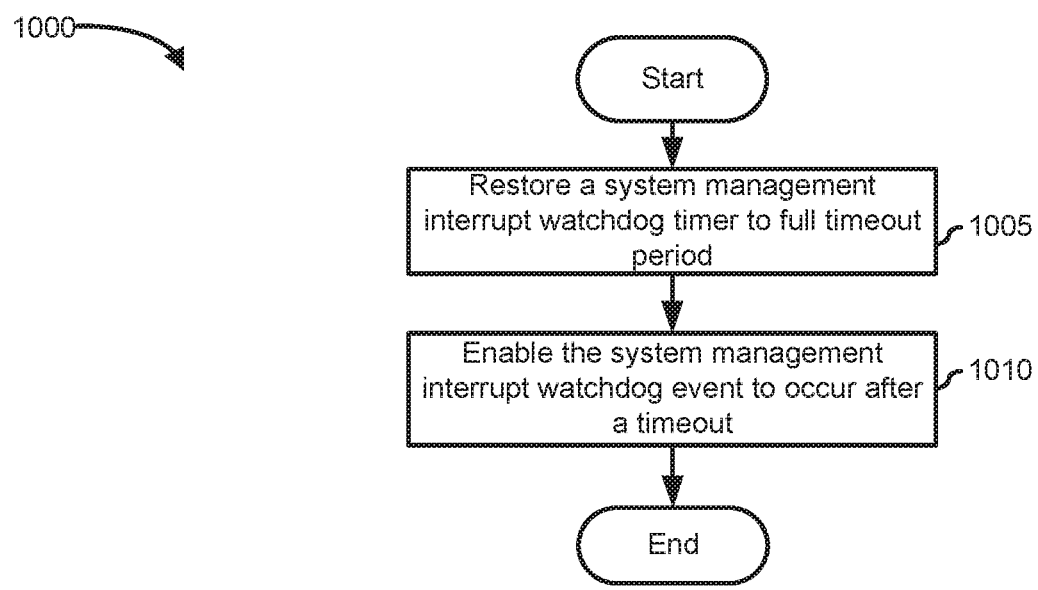
FIG. 10 is a flowchart illustrating an example of a method for resetting a timeout system management interrupt (SMI) counter, according to an embodiment of the present disclosure.

FIG. 10 illustrates a method 1000 for resetting the timeout SMI counter. Method 1000 is a detailed illustration of block 915 of FIG. 9 and may be performed by an SMI handler. In some embodiments, the SMI handler may be a DPTF SMI handler which is a platform level hardware/software solution for power and thermal management of information handling systems. For example, the DPTF may reduce idle power consumption through architecture improvements, such as integrated power gates and automated low-power states. The DPTF SMI handler may be a BIOS ACPI implementation for thermal management of components of the information handling system which may be included in the application processor and may also be communicatively coupled to the EC.

Method 1000 typically starts at block 1005 where the SMI handler restores the system to the full timeout period. The full timeout period may be based on the ACPI transaction or event to be performed. In particular, the full timeout period may be the approximate time that may elapse before the ACPI transaction and/or the operating system is deemed to have hanged. For example, the SMI handler may set the timer such as an SMI watchdog timer for a period that is approximately equal to the information handling system's two time slices, which are approximately 20 milliseconds. The SMI watchdog timer may be restarted by the operating system each time a DPTF SMI executes. The method then proceeds to block 1010 where the SMI handler enables an SMI watchdog event to occur after a timeout. The SMI watchdog event may be triggered if the operating system hangs so that the forensic data may be written to a non-volatile storage device. Then, the method ends.

Although the flowcharts show example blocks of the methods in some implementation, the methods may include additional blocks, fewer blocks, different blocks, or differently arranged blocks than those depicted in the flowcharts. Additionally, or alternatively, two or more of the blocks of the methods may be performed in parallel. For example, block 350 of method 300 and block 425 of method 400 may be performed in parallel.

In accordance with various embodiments of the present disclosure, the methods described herein may be implemented in hardware, firmware, software, or any combination thereof executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

As used herein, when two or more elements are referred to as "coupled" to one another, such term indicates that such two or more elements are in electronic communication or mechanical communication, as applicable, whether connected indirectly or directly, with or without intervening elements.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method for improving detection and capture of a catastrophic failure, the method comprising:
   intercepting, by a hardware application processor, a hang sensitive transaction that is to be performed by a bootstrap processor, wherein the bootstrap processor is configured to store data associated with the hang sensitive transaction in a random access memory prior to executing the hang sensitive transaction;
   initiating a timeout counter based on a threshold that is based on a maximum processing duration of the hang sensitive transaction;
   in response to detecting that the hang sensitive transaction has finished execution, stopping the timeout counter; and
   in response to the timeout counter reaching the threshold:
      retrieving the data associated with the hang sensitive transaction from the random access memory; and
      storing the retrieved data to a non-volatile storage.

2. The method of claim 1, wherein the random access memory is shared by the bootstrap processor and the hardware application processor.

3. The method of claim 1, deleting the data associated with the hang sensitive transaction in the random access memory subsequent to the storing the data to the non-volatile storage.

4. The method of claim 1, further comprising prior to executing the hang sensitive transaction, waking the hardware application processor, wherein the hardware application processor is configured to save forensic data upon the catastrophic failure of the hang sensitive transaction.

5. The method of claim 1, wherein the hang sensitive transaction includes one of an input/output access, a memory mapped input/output access, a peripheral component interconnect-express access, and a unified extensible firmware interface callback function.

6. The method of claim 1, wherein the non-volatile storage includes one of a complementary metal-oxide-semiconductor, a basic input/output non-volatile storage, an embedded controller non-volatile storage.

7. The method of claim 1, further comprising, in response to a successful execution of the hang sensitive transaction, putting the hardware application processor to sleep.

8. The method of claim 1, wherein the reaching the threshold is associated with the catastrophic failure of the hang sensitive transaction.

9. An information handling system, comprising:
   a memory device communicatively coupled to a boot processor and an application processor in the information handling system;
   the boot processor configured to execute a hang sensitive transaction, wherein the boot processor is communicatively coupled to the application processor, and wherein the hang sensitive transaction includes an input/output access, a peripheral component interconnect-express access, a memory mapped input/output access, and a callback function;
   prior to the execution of the hang sensitive transaction, the boot processor storing information associated with the hang sensitive transaction at the memory device; and
   the application processor configured to:
      monitor the information handling system to detect a catastrophic failure of the hang sensitive transaction; and
      in response to the detection of the catastrophic failure, to retrieve the information stored in the memory device and to store the retrieved information in a non-volatile storage device.

10. The information handling system of claim 9, further comprising determining whether the information is stored in a complementary metal-oxide-semiconductor before determining whether the information is stored in a basic input/output non-volatile memory device.

11. The information handling system of claim 9, further comprising deleting the information associated with the hang sensitive transaction from the memory device.

12. The information handling system of claim 9, wherein the application processor is configured to initiate a watchdog timer to be used in the detection of the catastrophic failure of the hang sensitive transaction, wherein the watchdog timer is based on a maximum execution time of the hang sensitive transaction.

13. The information handling system of claim 9, wherein the memory device communicatively coupled to the application processor and the boot processor includes a complementary metal-oxide-semiconductor, a basic input/output non-volatile memory device, and an embedded controller non-volatile memory device.

14. A method for saving forensic data after a catastrophic failure of an advanced configuration and power interface event executed by a bootstrap processor in an information handling system, the method comprising:
   in response to an occurrence of a system management interrupt, retrieving the forensic data from a shared memory and storing the forensic data in a non-volatile memory storage device, wherein the shared memory is allocated by the bootstrap processor as a platform communication channel, and wherein the forensic data was stored in the shared memory by the bootstrap processor prior to the execution of the advanced configuration and the power interface event.

15. The method of claim 14, wherein a watchdog timer reaching a predetermined threshold is an indication of a system hang event occurring during the execution of the advanced configuration and the power interface event.

16. The method of claim 15, wherein the predetermined threshold is a maximum processing time of the advanced configuration and the power interface event.

17. The method of claim 15, further comprising subsequent to the occurrence of the system management interrupt, disabling the watchdog timer.

18. The method of claim 15, further comprising subsequent to the occurrence of the system management interrupt, restarting the watchdog timer.

19. The method of claim 14, further comprising:
- determining whether one of a basic input output system non-volatile memory or an embedded controller non-volatile memory is available;
- in response to the determining that one of the basic input output system non-volatile memory and the embedded controller non-volatile memory is available, storing information associated with the advanced configuration and the power interface event in the available non-volatile memory; and
- in response to the determining that both the basic input output system non-volatile memory and the embedded controller non-volatile memory are not available, storing the information associated with the advanced configuration and the power interface event in a complementary metal-oxide-semiconductor.

\* \* \* \* \*